United States Patent [19]

Berg

[11] 4,268,229

[45] May 19, 1981

[54] TURBOCHARGER SHAFT SEAL ARRANGEMENT

[75] Inventor: Paul H. Berg, Van Nuys, Calif.

[73] Assignee: The Garrett Corporation, Los Angeles, Calif.

[21] Appl. No.: 31,685

[22] Filed: Apr. 19, 1979

[51] Int. Cl.³ .............................................. F16J 15/42
[52] U.S. Cl. .................................. 417/407; 415/111; 415/170 R
[58] Field of Search .......... 415/110, 111, 112, 169 R, 415/169 A, 170 A; 417/407

[56] References Cited

U.S. PATENT DOCUMENTS 4,171,137 10/1979 Aizu et al. .................... 415/111 X
4,196,910 4/1980 Aizu ............................... 417/407 X Primary Examiner—Christopher K. Moore
Attorney, Agent, or Firm—Stuart O. Lowry; Albert J. Miller; Joel D. Talcott

[57] ABSTRACT

A shaft seal ring arrangement for turbochargers comprises a pair of vented seal rings for preventing passage of bearing lubricant into the turbocharger turbine housing.

19 Claims, 2 Drawing Figures

4,268,229

TURBOCHARGER SHAFT SEAL ARRANGEMENT

BACKGROUND OF THE INVENTION

This invention relates to turbocharger shaft seal arrangements. More specifically, this invention relates to an improved seal arrangement for the turbine end of a turbocharger shaft for preventing passage of bearing lubricants into the turbine housing.

Turbochargers in general are well known in the art, and typically comprise a turbine wheel and a compressor wheel mounted on a common shaft and carried respectively within turbine and compressor housings. These turbine and compressor housings are in turn mounted on a so-called center housing which rotatably carries and supports the common shaft within suitable bearings, and provides lubricant guide passages for circulating sufficient lubricant to the bearings to prevent excessive heat and wear. Of course, during operation of the turbocharger, exhaust gases from an engine rotatably drive the turbine wheel which, in turn, rotatably drives the compressor wheel for supplying compressed charge air to the engine.

In turbochargers, it is important to provide relatively leak-free seals between the shaft bearings within the center housing, and the rotating turbine and compressor wheels. This is particularly true at the turbine end of the shaft, since the turbine typically operates in a relatively high temperature environment. Accordingly, it is desirable to prevent leakage of bearing lubricant into the turbine housing to prevent gumming and/or coking of the lubricant which can detrimentally affect turbine performance. Moreover, partial ignition of the lubricant within the turbine housing can have adverse effects on the level of pollutants discharged to atmosphere by an engine system.

Many prior art seal arrangements have attempted to reduce or eliminate leakage of lubricant out of a turbocharger center housing. The majority of these techniques involve the inclusion of one or more seal rings received about the shaft for sealing passage of the shaft through a center housing side wall into either the turbine or compressor housing. See, for example, U.S. Pat. Nos. 1,900,849; and 2,890,069. Other seal arrangements have attempted to vent the seal within the center housing in an effort to allow lubricant contacting the seal to drain therefrom. See, for example, U.S. Pat. Nos. 3,565,497; 3,834,156; 4,101,241; 4,107,927; and Japanese Utility Model Publication 48-26204. Still other designs have included a slinger or the like on the shaft for pumping excess lubricant within the center housing radially away from a seal ring. See, for example, U.S. Pat. Nos. 1,463,018; 3,053,541; 3,494,679; and 4,095,857. Further design arrangements have included relatively complicated labyrinth-type seal or packing seal constructions which may be combined with slingers or the like to provide a lubricant barrier arrangement. See, for example, U.S. Pat. Nos. 1,211,166; 2,910,328 and 3,004,782. However, these various prior art seal arrangements have not proven totally satisfactory, particularly during those conditions of turbocharger operation wherein a positive pressure differential exists between the center housing and the turbine housing. When such a positive pressure differential exists, available prior art seals such as those discussed above have shown an annoying tendency to leak lubricant into the turbine housing even at relatively low pressure differentials.

This invention overcomes the problems and disadvantages of the prior art by providing an improved turbocharger shaft seal arrangement for the turbine end of the shaft having substantially improved resistance to leakage of the lubricant into the turbine housing.

SUMMARY OF THE INVENTION

In accordance with the invention, a shaft seal arrangement is provided for a turbocharger comprising turbine and compressor wheels mounted on a common shaft, and respectively received within turbine and compressor housing. The commmon shaft is rotatably supported within a center housing mounted between the turbine and compressor housings. More specifically, the center housing includes opposed side walls for connection to the adjacent turbine and compressor housings, and a central bearing carriage including a bearing bore for receiving suitable bearings for rotatably supporting the shaft. Conveniently, at least two sets of the bearings are provided within the center housing generally adjacent opposite ends of the shaft for providing stable shaft support.

At the turbine end of the shaft, a first seal ring is received over the shaft within the bearing bore for preventing passage of bearing lubricant in an outboard direction along the shaft. A first vent or drain passage within the bearing bore circumferentially surrounds the shaft between the bearing and the first seal ring, and serves to guide bearing lubricant directly to a suitable drain or sump. Moreover, the bearing carriage is axially spaced from the adjacent center housing side wall by a second vent or drain passage which circumferentially surrounds the shaft, and passage of the shaft through the side wall into the turbine housing is further sealed by a second seal ring. A slinger or the like on the shaft within the second vent passage pumps excess lubricant away from the second seal ring toward the sump.

BRIEF DESCRIPTION OF THE DRAWINGS

The accompanying drawings illustrate the invention. In such drawings.

DETAILED DESCRIPTION OF THE PREFERRED EMBODIMENT

Figure 1:
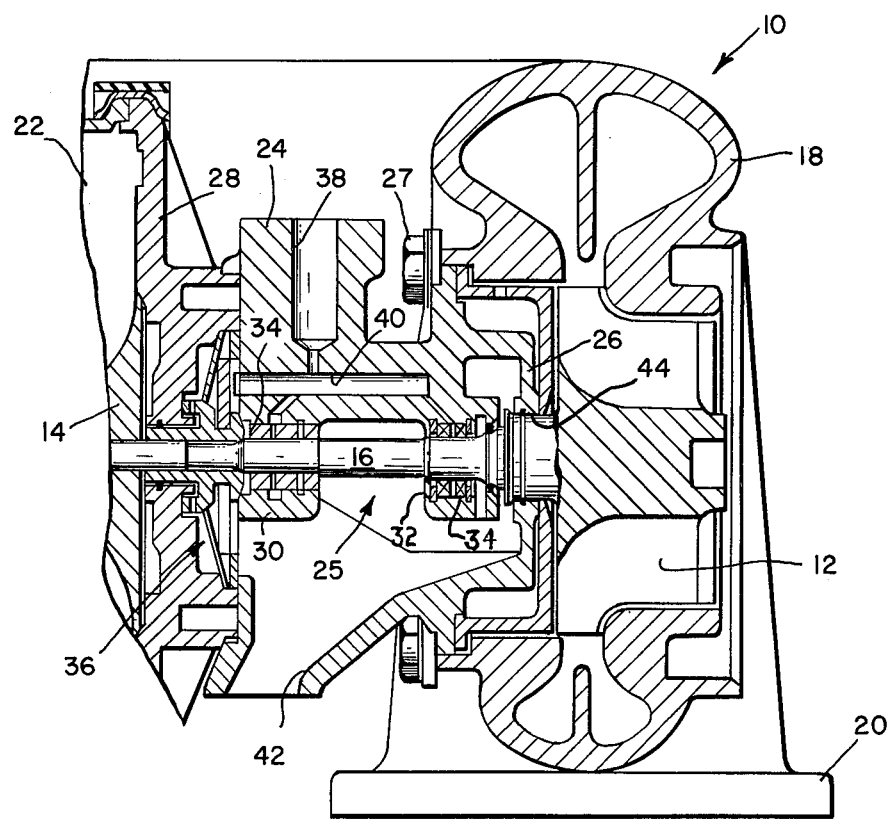
FIG. 1 is a fragmented elevation view of a turbocharger including the shaft seal arrangement of this invention.

A turbocharger 10 is shown in FIG. 1, and generally comprises a turbine wheel 12 and a compressor wheel 14 mounted on opposite ends of a common shaft 16. The turbine wheel 12 is disposed within a turbine housing 18 which includes an inlet 20 for receiving exhaust gases from an engine (not shown). The turbine housing 18 guides the engine exhaust gases into communication with and expansion through the turbine wheel 12 for rotatably driving the turbine wheel. Such driving of the turbine wheel simultaneously rotatably drives the compressor wheel 14 which is carried within a compressor housing 22. The compressor wheel 14 and housing 22 function to draw in and compress ambient air for supply to the intake of the engine as by suitable conduit means (not shown).

The turbine housing 18 and the compressor housing 22 are mounted upon an intermediate center housing 24 as by bolts 27 or the like. The center housing 24, as shown in FIG. 1, includes opposed side walls 26 and 28 for interfacing with the adjacent turbine and compressor housings 18 and 22, respectively. Moreover, the center housing 24 includes a bearing carriage 25 comprising a pair of bearing bosses 30 which are axially spaced from each other generally adjacent the opposite side walls 26 and 28. The bearing bosses 30 form bearing bores 32 for reception of suitable journal bearings 34 for rotatably receiving and supporting the shaft 16. Conveniently, as shown, a thrust bearing assembly 36 is also carried about the shaft 16, preferably adjacent the compressor side wall 28, for preventing axial excursions of the shaft 16. While the thrust bearing assembly 36 is not described in detail, a thrust bearing assembly construction generally along the lines of that disclosed in U.S. Pat. No. 3,494,679 is preferred.

Lubricant such as engine oil or the like is supplied via the center housing 24 to the journal bearings 34 and to the thrust bearing assembly 36. To this end, a lubricant inlet port 38 is formed in the center housing 24, and is adapted for connection to a suitable source of lubricant such as filtered engine oil. The port 38 communicates with a network of internal supply passages 40 which are suitably formed in the center housing 24 to direct the lubricant to the appropriate bearings. In this manner, excessive bearing wear and heating within the center housing is avoided to prolong turbocharger operating life. This lubricant circulated to the bearings is collected in a suitable sump or drain 42 for appropriate filtering, cooling, and recirculation, all in a well known manner.

The invention of this application comprises an improved shaft seal arrangement for the turbine end of the turbocharger shaft 16. More specifically, the invention comprises an improved arrangement for preventing lubricant supplied to the bearing 34 at the turbine end of the shaft 16 from leaking along the shaft and into the turbine housing 18. In the prior art, such leakage comprises a significant design problem in that the lubricant tends to readily pump through the shaft passage opening 44 in the side wall 26 whenever a positive pressure differential exists between the center housing interior and the turbine housing interior. That is, whenever the pressure within the center housing 24 exceeds the pressure within the turbine housing 18, the lubricant is drawn from the adjacent bearing 34 along the shaft 16 and through the shaft opening 44.

Figure 2:
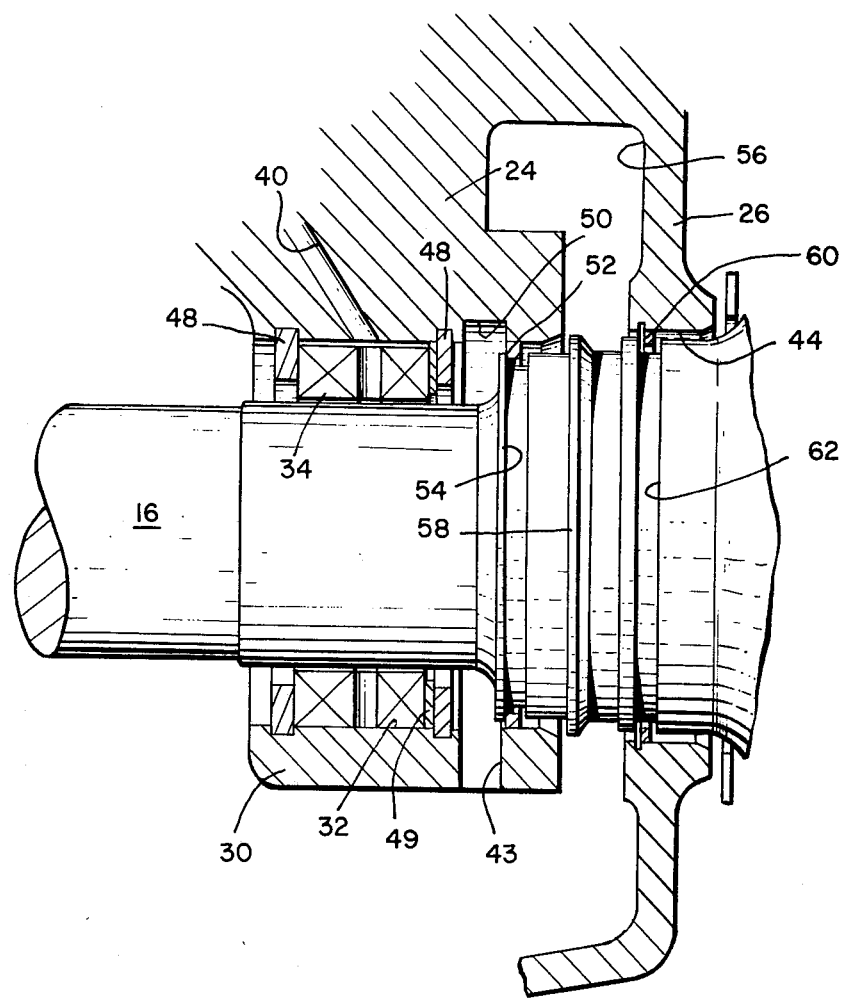
FIG. 2 is an enlarged portion of FIG. 1 illustrating the invention.

The shaft seal arrangement of this invention is shown in more detail in FIG. 2. As shown, the bearing boss 30 adjacent the turbine side wall 26 includes a pair of axially opposed retaining rings 48 for closely constraining the axial position of the bearing 34. If desired, a wear washer 49 may also be provided between the bearing 34 and the outboard retaining ring 48, as shown. Lubricant supplied to the bearing 34 via the supply passages 40 freely passes to the sump 42 at the inboard end of the bearing 34. Importantly, however, the bearing boss 30 includes at the outboard end of the bearing 34 a drain or vent passage 50 which circumferentially surrounds the shaft 16, and communicates with the sump 42 via a lower port 43. With this construction, lubricant collecting at the outboard end of the bearing 34 is provided with a closely adjacent and open flow path directly communicating with the sump 42. Importantly, a seal ring 52 is retained in an annular groove 54 formed in the shaft 16, and is axially disposed within the bearing bore 32 in an outboard position with respect to the drain or vent passage 50. This seal ring 52 functions to substantially block lubricant from passing through the bearing bore 32, and along the shaft 16 toward the shaft opening 44 in the turbine side wall 26. Instead, the seal ring 52 directs the lubricant into the vent passage 50 for direct drainage to the sump 42.

The outboard end of the bearing boss 30 is axially spaced from turbine side wall 26 to define a secondary drain or vent passage 56 circumferentially surrounding the shaft 16. This latter vent passage 56 is relatively enlarged as compared to the vent passage 50, and is axially aligned with a slinger 58 or the like which may be integrally formed on the shaft 16. The slinger 58 functions, upon shaft rotation, to pump any lubricant on the shaft 16 in a radially outward direction into the secondary vent passage 56. This vent passage 56 openly communicates at its lower end with the turbocharger sump 42, and thereby collects lubricant and guides the lubricant to the sump. In this manner, lubricant escaping past the first seal ring 50 along the shaft 16 is effectively directed away from the shaft opening 44 in the side wall 26 to prevent leakage of lubricant into the turbine housing 18. However, to further protect against leakage, another or second seal ring 60 is received within an annular groove 62 in the shaft, and sealingly engages the side wall 26 within the shaft opening 44.

The shaft seal arrangement of this invention including a first seal ring 52 within the bearing bore 32 and a second seal ring 60 within the shaft opening 44, wherein both seal rings 52 and 60 include drainage means disposed in an inboard position with respect thereto, provides substantially improved lubricant sealing performance during normal operation of the turbocharger. For example, this shaft seal arrangement has been demonstrated to be effective with positive pressure differentials between the center housing 24 and the turbine housing 18 of up to about 8.0 inches $H_2O$. Accordingly, the shaft seal arrangement of this invention provides a substantial improvement over previous turbine end shaft seal arrangements of the prior art.

A variety of modifications and improvements of the invention described herein are believed to be possible without varying from the scope thereof. Accordingly, no limitation of the invention is intended by way of the foregoing description, except as set forth in the appended claims.

What is claimed is:

1. In a turbocharger having a center housing with a bearing boss defining a bearing bore receiving bearing means rotatably supporting a turbocharger shaft, a sump for collecting for recirculation lubrication supplied to the bearing means, and a turbine wheel mounted on said shaft within a turbine housing, a method of sealing passage of the shaft into the turbine housing through a shaft opening in a center housing side wall to prevent leakage of lubricant into the turbine housing, comprising the steps of mounting a first seal ring on the shaft within the bearing boss in a position spaced axially in an outboard direction from the bearing means; forming a first vent within the bearing boss circumferentially about the shaft and axially between said first seal ring and the bearing means, and in open communication with the sump; mounting a second seal ring on the shaft within the side wall shaft opening; and forming a second vent circumferentially about the shaft and axially between said first and second seal rings, and in open communication with the sump.

2. The method of claim 1 including the step of disposing a slinger on said shaft within said second vent.

3. The method of claim 1 wherein said steps of forming said first and second vents include forming said second vent to be relatively larger than said first vent, and including the step of disposing a slinger on the shaft within said second vent.

4. The method of claim 1 including the step of axially constraining the bearing means with retaining rings disposed inboard with respect to said first vent.

5. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, a method of sealing passage of the shaft into the turbine housing through a shaft opening in a center housing side wall to prevent leakage of lubricant into the turbine housing comprising the steps of mounting a first seal ring on the shaft within the bearing boss in a position spaced axially in an outboard direction from the bearing means; forming a first vent within the bearing boss between said first seal ring and the bearing means, and circumferentially surrounding said shaft in open communication with the sump; mounting a second seal ring on the shaft within the side wall shaft opening; forming a second vent between said first and second seal rings, and circumferentially surrounding said shaft in open communication with the sump; and disposing a slinger on the shaft axially within said second vent.

6. The method of claim 5 including the step of axially constraining the bearing means with retaining rings disposed inboard with respect to said first vent.

7. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, a method of sealing passage of the shaft into the turbine housing through a shaft opening in a center housing side wall to prevent leakage of lubricant into the turbine housing, comprising the steps of forming a first vent within the bearing boss adjacent to the outboard end of the bearing means, said first vent extending circumferentially about the shaft and being in open communication with the sump; mounting a first seal ring on the shaft within the bearing boss in an outboard position with respect to the first vent; axially spacing the bearing boss with respect to the side wall to form a second vent between said first seal ring and the side wall, said second vent extending circumferentially about the shaft and being in open communication with the sump; and mounting a second seal ring on the shaft within the side wall shaft opening.

8. The method of claim 7 including the step of disposing a slinger on said shaft within said second vent.

9. The method of claim 7 including the step of axially constraining the bearing means with retaining rings disposed inboard with respect to said first vent.

10. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, a method of sealing passage of the shaft into the turbine housing through a shaft opening in a center housing side wall to prevent leakage of lubricant into the turbine housing, comprising the steps of forming a first vent within the bearing boss adjacent to the outboard end of the bearing means, said first vent extending circumferentially about the shaft and being in open communication with the sump; mounting a first seal ring on the shaft within the bearing boss in an outboard position with respect to the first vent; axially spacing the bearing boss with respect to the side wall to form a second vent between said first seal ring and the side wall, said second vent extending circumferentially about the shaft and being in open communication with the sump; disposing a slinger on the shaft axially within said second vent; and mounting a second seal ring on the shaft within the side wall shaft opening.

11. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, means for sealing passage of the shaft into the turbine housing through a shaft opening in a center housing side wall to prevent leakage of lubricant into the turbine housing, comprising a first seal ring mounted on the shaft within the bearing boss in a position spaced axially in an outboard direction from the bearing means; a first vent formed in said center housing within the bearing boss circumferentially about the shaft and axially between said first seal ring and the bearing means, and in open communication with the sump; a second seal ring mounted on the shaft within the side wall shaft opening; and a second vent formed in said center housing circumferentially about the shaft and axially between said first and second seal rings, and in open communication with the sump.

12. The invention as set forth in claim 11 including a slinger disposed on the shaft axially within said second vent.

13. The invention as set forth in claim 11 including retaining rings disposed inboard with respect to said first vent for axially constraining the bearing means.

14. The invention as set forth in claim 11 wherein said bearing boss is axially spaced from said side wall to define said second vent.

15. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, means for sealing passage of the shaft into the turbine housing through a shaft opening in a center housing side wall to prevent leakage of lubricant into the turbine housing, comprising a first seal ring mounted on the shaft within the bearing boss in a position spaced in an axially outboard direction from the bearing means; a first vent formed in said center housing within the bearing boss circumferentially about the shaft and axially between said first seal ring and the bearing means, and in open communication with the sump; a second seal ring mounted on the shaft within the side wall shaft opening; a second vent formed in said center housing circumferentially about the shaft and axially between said first and second seal rings, and in open communication with the sump; and a slinger disposed on the shaft axially within said second vent.

16. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, means for sealing passage of the shaft into the turbine housing through a shaft opening in a center housing side wall to prevent leakage of lubricant into the turbine housing, comprising a first vent formed in said center housing within the bearing boss adjacent the outboard end of the bearing means, said first vent extending circumferentially about the shaft and being in open communication with the sump; a first seal ring mounted on the shaft within the bearing boss in an outboard position with respect to said first vent; a second vent formed in said center housing between said first seal ring and the side wall, said second vent extending circumferentially about the shaft and being in open communication with the sump; and a second seal ring mounted on the shaft within the side wall shaft opening.

17. The invention as set forth in claim 16 including a slinger disposed on the shaft axially within said second vent.

18. In a turbocharger having a center housing with a bearing boss defining a bearing bore receiving bearing means rotatably supporting a turbocharger shaft, a sump for collecting for recirculation lubricant supplied to the bearing means, and a turbine wheel mounted on said shaft within a turbine housing, means for sealing passage of the shaft into the turbine housing through a shaft opening in a center housing side wall to prevent leakage of lubricant into the turbine housing, comprising a first vent formed in said center housing within the bearing boss adjacent to the outboard end of the bearing means, said first vent extending circumferentially about the shaft and being in open communication with the sump; a first seal ring mounted on the shaft within the bearing boss in an outboard position with respect to said first vent; a second vent formed in said center housing between said first seal ring and the side wall; a slinger disposed on the shaft axially within said second vent; and a second seal ring mounted on the shaft within the side wall shaft opening, said second vent extending circumferentially about the shaft and being in open communication with the sump.

19. A turbocharger comprising a turbine wheel and a compressor wheel mounted on a common shaft and disposed within turbine and compressor housings, respectively; a center housing coupled between said turbine and compressor housing, and including a bearing boss defining a bearing bore receiving bearing means for rotatably supporting said shaft, said shaft extending from the bearing means in an outboard direction into the turbine housing through a shaft opening formed in said center housing; a sump for collecting for recirculation lubricant supplied to the bearing means; a first vent formed in said center housing within the bearing boss adjacent to the outboard end of the bearing means, said first vent circumferentially surrounding said shaft and openly communicating with said sump; a first seal ring mounted on said shaft within the bearing boss in an outboard position with respect to said first vent; a second vent formed in said center housing in an outboard position with respect to said first seal ring, said second vent circumferentially surrounding said shaft and openly communicating with said sump; a slinger disposed on said shaft axially within said second vent; and a second seal ring mounted on said shaft within the shaft opening.

* * * * *